United States Patent
Watanabe

(10) Patent No.: US 7,191,214 B2
(45) Date of Patent: Mar. 13, 2007

(54) CONFERENCE SYSTEM AND ITS PARTICIPATION METHOD

(75) Inventor: Mitsuhiro Watanabe, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 850 days.

(21) Appl. No.: 10/353,269

(22) Filed: Jan. 28, 2003

(65) Prior Publication Data

US 2003/0145052 A1    Jul. 31, 2003

(30) Foreign Application Priority Data

Jan. 30, 2002    (JP)    ............... 2002/021943

(51) Int. Cl.
*G06F 15/13* (2006.01)
(52) U.S. Cl. ............... 709/204; 709/203; 345/751
(58) Field of Classification Search ............... 709/204, 709/203; 345/751
See application file for complete search history.

(56) References Cited

U.S. PATENT DOCUMENTS 6,286,034 B1    9/2001   Sato et al.
2002/0078153 A1*   6/2002   Chung et al. ............... 709/204
2002/0103864 A1*   8/2002   Rodman et al. ............ 709/204
2003/0085923 A1*   5/2003   Chen et al. ................ 345/751
2004/0010549 A1*   1/2004   Matus et al. ............... 709/204

* cited by examiner

*Primary Examiner*—Nathan J. Flynn
*Assistant Examiner*—Jinsong Hu
(74) *Attorney, Agent, or Firm*—Fitzpatrick, Cella, Harper & Scinto

(57) ABSTRACT

A conference apparatus has a memory to store information relating to devices and their owners, and determines a device owned by each participant based on the information stored in the memory. The conference apparatus notifies an interface apparatus the devices owned by each participant and the devices upon which the conference apparatus determines whether to allow participants to participate in a conference; the interface apparatus sends a permission to participate in the conference to a device owned by each participant and transfers to the conference apparatus a conference participation request received from each device upon which the conference apparatus determines whether to allow the corresponding participant to participate in the conference.

5 Claims, 10 Drawing Sheets

Fig. 6

| A | Employee ID-A | Password-A | | | | |
|---|---|---|---|---|---|---|
| | MAC-A1 | MAC-A2 | MAC-A3 | Portable ID-A1 | Portable ID-A2 |
| B | Employee ID-B | Password-B | | | | |
| | MAC-B1 | MAC-B2 | | | | |
| C | Employee ID-C | Password-C | | | | |
| | MAC-C1 | Portable ID-C1 | Portable ID-C2 | | | |

| Shared equip | MAC-Share 1 | MAC-Share 2 | MAC-Share 3 | Portable ID-Share 1 | Portable ID-Share 2 |
|---|---|---|---|---|---|

Fig. 7

| Conference Room 1 | I/F–ID1 | I/F–ID2 | I/F–ID3 | I/F–ID4 | I/F–ID5 |
|---|---|---|---|---|---|
| Time/Date α | Conference Name α | Participant α1 | Participant α2 | Participant α3 | Participant α4 |
|  |  | Participant α5 | Participant α6 | Participant α7 | Participant α8 |
| Time/Date β | Conference Name β | Participant β1 | Participant β2 | Participant β3 | Participant β4 |
|  |  | Participant β5 |  |  |  |
| Time/Date γ | Conference Name γ | Participant γ1 | Participant γ2 | Participant γ3 | Participant γ4 |
|  |  | Participant γ5 | Participant γ6 | Participant γ7 |  |

Fig. 12

| Conference Name α | File α1 | File α2 | File α3 |       |
|---|---|---|---|---|
| Conference Name β | File β1 | File β2 |         |       |
| Conference Name γ | File γ1 | File γ2 | File γ3 | File γ4 |
|                   | File γ5 |         |         |       |

CONFERENCE SYSTEM AND ITS PARTICIPATION METHOD

BACKGROUND OF THE INVENTION

1. Field of the Invention

The present invention relates to a conference system.

2. Related Background Art

Conventionally, when participants, each with a notebook PC, a PDA, a cellular phone or other equipment, hold a conference, a host PC installed in a conference room verifies each participant and grants the participant a permission to participate in the conference.

Such a conference system will be described with reference to FIGS. 1 through 3. FIG. 1 shows a structure of a conference system according to a related art; FIG. 2 is a flowchart indicating the control procedure of a notebook PC in the conference system in FIG. 1; and FIG. 3 is a flowchart indicating the control procedure of a host PC in the conference system in FIG. 1.

In the conference system, a dedicated host PC 907 is installed in a conference room and a projector 908 is connected to the host PC 907, as shown in FIG. 1. Participants in the conference have notebook PCs 901–905 and use them to connect to a network 906.

In each of the notebook PCs 901–905, as shown in FIG. 2, first an ID is input in step S1001, and a conference participation request is sent to the host PC 907 in the following step S1002. In step S1003, a determination is made as to whether a conference participation permission has been received from the host PC 907. If the conference participation permission has been received from the host PC 907, the corresponding participant participates in the conference in step S1004. On the other hand, if the conference participation permission is not received from the host PC 907, i.e., if a conference participation refusal is received, the corresponding participant in step S1005 does not participate in the conference.

As shown in FIG. 3, the host PC 907 waits for conference participation requests to be sent from notebook PCs 901–905 in step S1101, and once a conference participation request is received from one of the notebook PCs 901–905, the host PC 907 in step S1102 compares the ID included in the conference participation request received against an ID stored in advance. If the two match, the host PC 907 sends a conference participation permission to the corresponding notebook PC in step S1103. On the other hand, if the two do not match, the host PC 907 sends a conference participation refusal to the corresponding notebook PC in step S1104.

According to the conference system described above, each ID must be registered in order to have a permission to participate in a conference granted or refused, but this is a time-consuming process.

SUMMARY OF THE INVENTION

The present invention relates to a conference apparatus, system and program that allow participants to participate in conferences using a simple procedure.

The present invention also relates to a conference apparatus, system and program that can securely limit the equipment allowed to participate in a conference.

The present invention also relates to a conference apparatus, system and program that can flexibly limit the equipment allowed to participate in a conference.

The present invention further relates to a conference apparatus, system and program that can restrict access to files.

The present invention also relates to reducing load on a conference apparatus.

In accordance with an embodiment of the present invention, a conference apparatus includes a memory unit that stores information relating to at least one device and an owner of the at least one device, a designating unit that designates at least one participant in a conference, and a judging unit that judges if a device owned by the at least one participant designated by the designating device matches the at least one device stored in the memory unit. The devices may be capable of communication through a network. For example, the devices may be computer terminals, notebook PCs, personal data assistants (PDAs), or cellular phones.

Other features and advantages of the invention will be apparent from the following detailed description, taken in conjunction with the accompanying drawings that illustrate, by way of example, various features of embodiments of the invention.

BRIEF DESCRIPTION OF THE DRAWINGS

FIG. 5 (B) shows a diagram of the structure of a wireless interface in FIG. 4.

FIG. 6 shows a table indicating one example of employee ID information stored in the host PC in FIG. 4.

FIG. 7 shows a table indicating one example of conference participant information stored in the host PC in FIG. 4.

FIG. 12 shows a table indicating one example of information that correlates individual files accessed during various conferences to a corresponding conference, which is used to limit authorization to access files in the conference system in FIG. 4.

DETAILED DESCRIPTION OF THE PREFERRED EMBODIMENTS

Preferred embodiments of the present invention will be described below with reference to the accompanying drawings.

Figure 1:
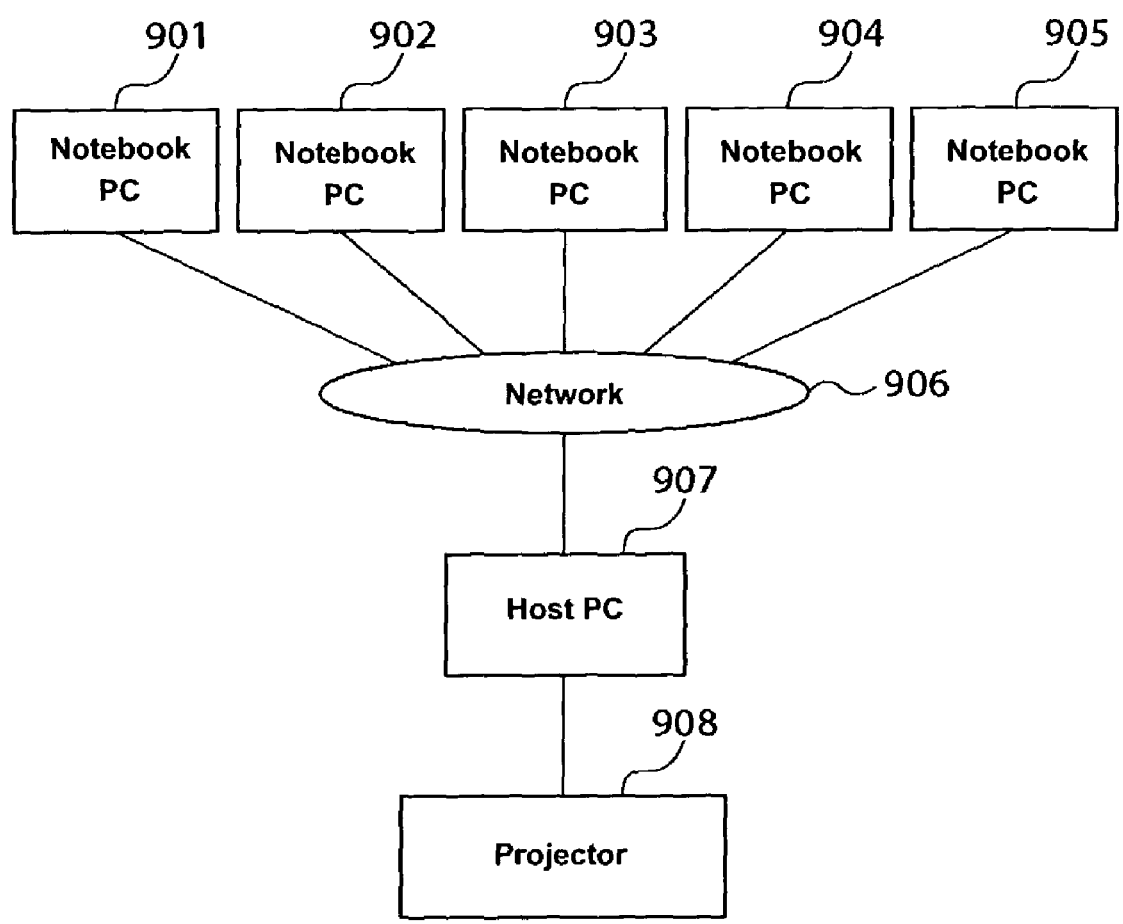
FIG. 1 shows a diagram illustrating the structure of a conference system according to a related art.
Figure 2:
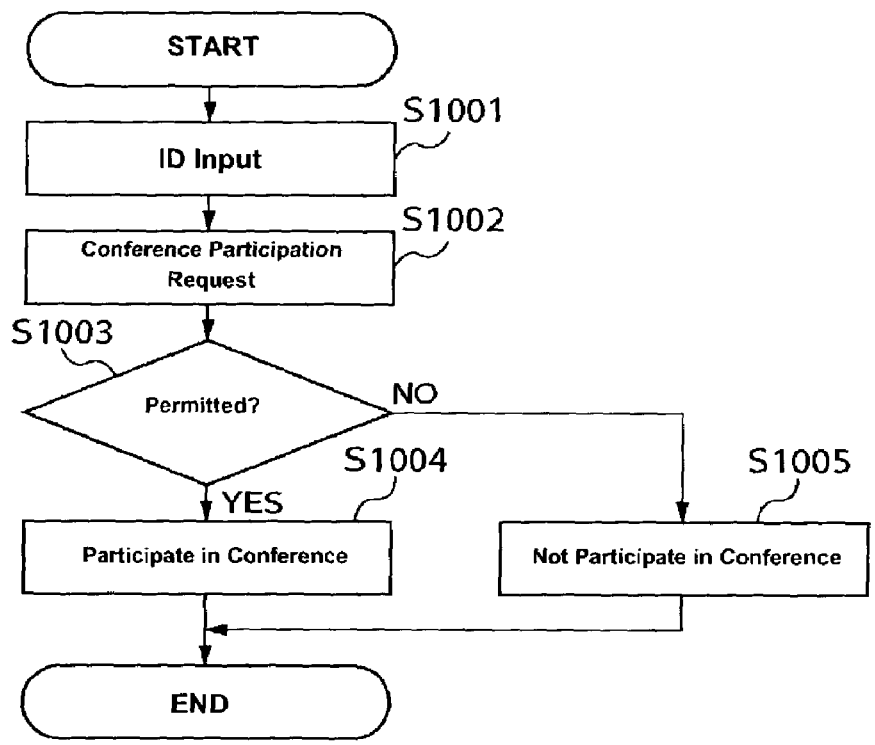
FIG. 2 shows a flowchart of a control procedure of a notebook PC in the conference system in FIG. 1.
Figure 3:
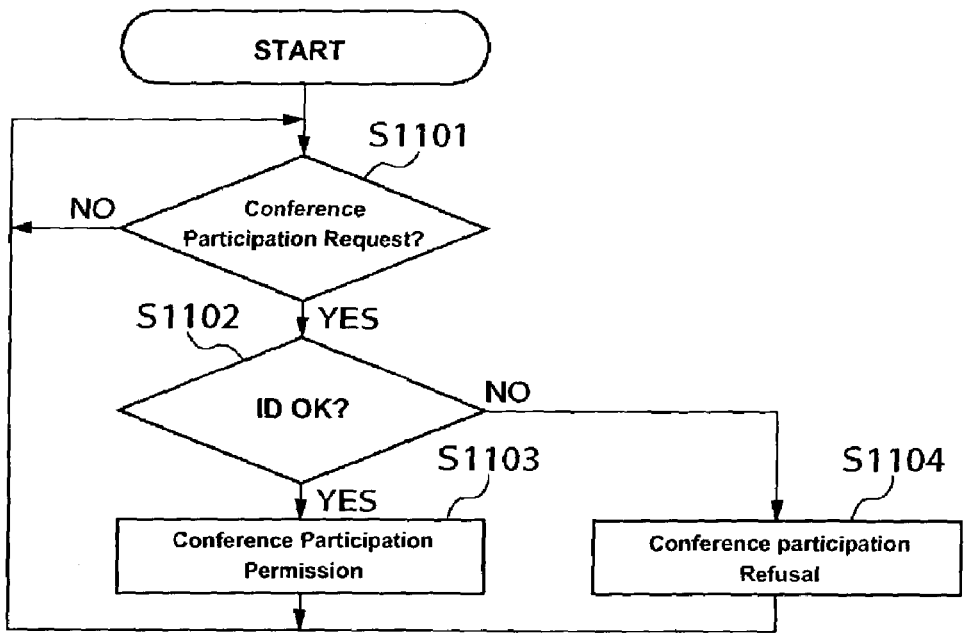
FIG. 3 shows a flowchart of a control procedure of a host PC in the conference system in FIG. 1.
Figure 4:
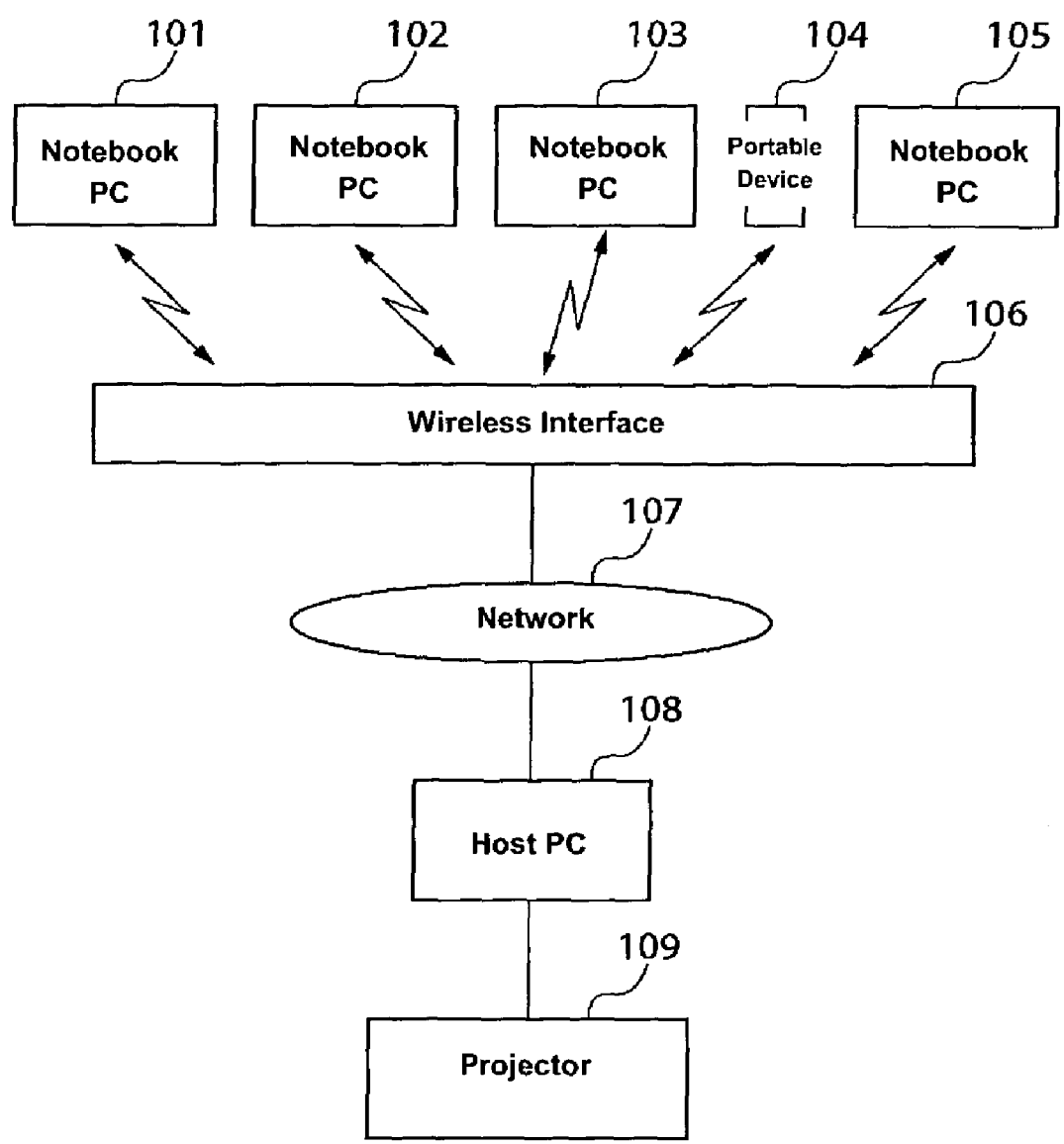
FIG. 4 shows a diagram illustrating the structure of a conference system according to one embodiment of the present invention.
Figure 5:
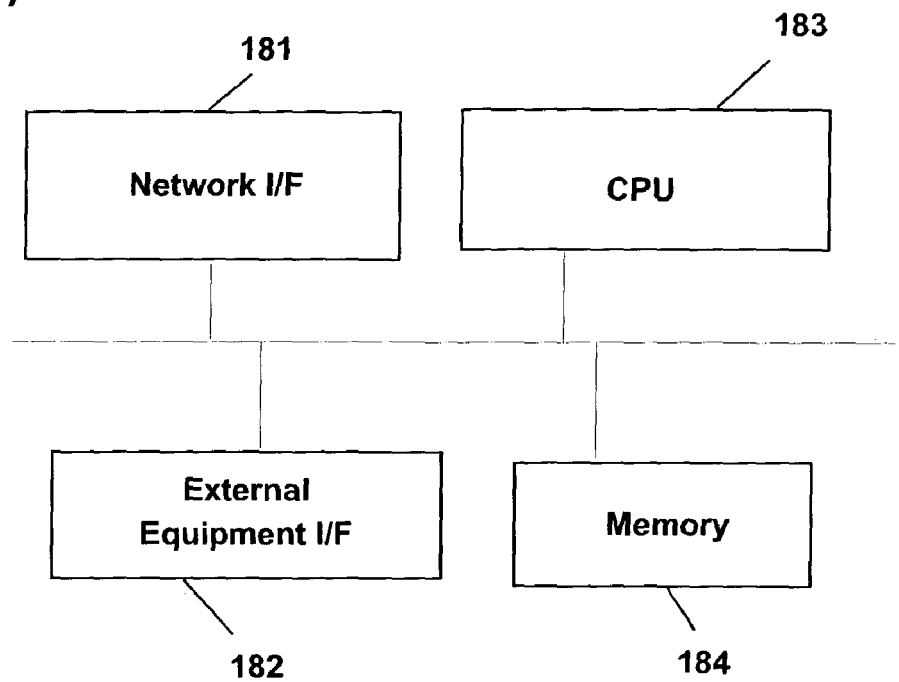
FIG. 5 (A) shows a diagram of the structure of a host PC in FIG. 4.
Figure 5:
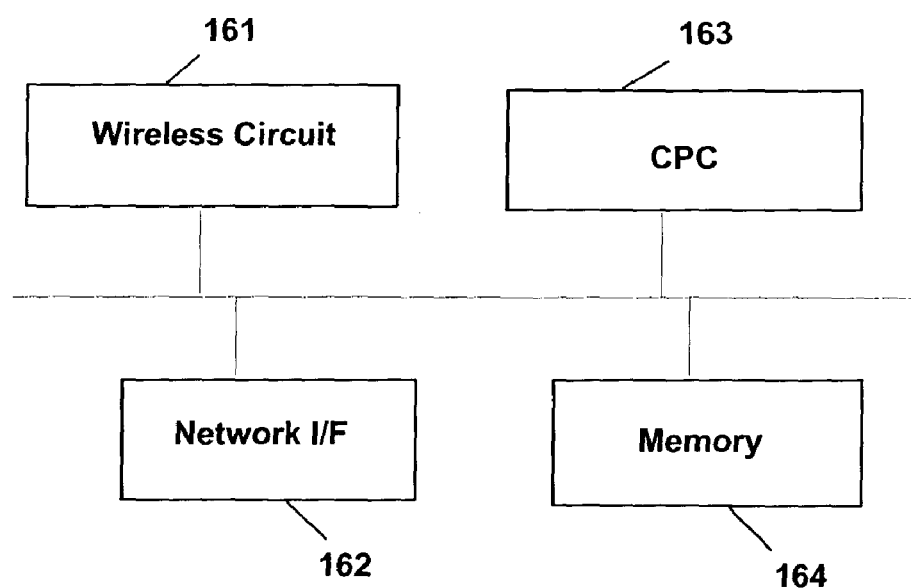

FIG. 4 is a diagram illustrating the structure of a conference system according to one embodiment of the present invention, and FIGS. 5 (A) and (B) are diagrams illustrating the structure of a host PC in FIG. 4. FIG. 6 is a table indicating one example of employee ID information stored in the host PC in FIG. 4, and FIG. 7 is a table indicating one example of conference participant information stored in the host PC in FIG. 4.

In the conference system, as shown in FIG. 4, a dedicated host PC 108 is installed in a conference room, and a projector 109 may be connected to the host PC 108. Participant in the conference may have devices that are capable of communication through a network, such as, for example, notebook PCs 101, 102, 105, PDA 103, cellular phone 104, and the like. Each of these devices is connected to a network 107 via a wireless interface 106. The wireless interface 106 can be any interface compatible with the wireless method, such as the IEEE 802.11 series, Bluetooth or IMT 2000.

The host PC 108 has, as indicated in FIG. 5 (A), a network interface 181 to connect with the network 107, an external equipment interface 182 to connect with the projector 109, a CPU 183 and a memory 184. The CPU 183 is a microcomputer and operates according to programs stored in the memory 184. The memory 184 is a storage medium that stores such programs to be read by the CPU 183.

The network interface 181 communicates, via the network 107 and the wireless interface 106, with the notebook PCs 101, 102 and 105, the PDA 103 and the cellular phone 104.

The wireless interface 106 has, as indicated in FIG. 5 (B), a wireless circuit 161 to wirelessly connect with the notebook PCs 101, 102, 105, the PDA 103, and the cellular phone 104; a network interface 162 to connect with the network 107; a CPU 163; and a memory 164. The CPU 163 is a microcomputer and operates according to programs stored in the memory 164. The memory 164 is a storage medium that stores such programs to be read by the CPU 163.

The network interface 162 communicates with the host PC 108 via the network 107. The wireless circuit 161 communicates with the notebook PCs 101, 102 and 105, the PDA 103 and the cellular phone 104.

Except for the fact that it has user interfaces such as a keyboard instead of the network interface 162 to connect with the network 107, each of the notebook PCs also has the same structure illustrated in FIG. 5 (B).

The memory 184 of the host PC 108 stores employee information indicated in FIG. 6. In the present example, each of the employees A, B and C can participate in conferences using an employee ID-A, an employee ID-B, and an employee ID-C, respectively, as well as a password A, a password B and a password C, respectively. In addition, the employee A has three equipment with MAC addresses MAC-A1, MAC-A2 and MAC-A3, as well as two cellular phones with cellular IDs cellular ID-A1 and cellular ID-A2; this information is stored correlated to the employee A. The corresponding MAC addresses and cellular phone IDs of terminals the employees B and C each own are correlated similarly to the corresponding employee and stored.

The memory 184 of the host PC 108 also stores MAC addresses and cellular phone IDs of shared equipment.

In addition, the memory 184 of the host PC 108 stores conference participant information shown in FIG. 7. Assuming that the conference room in which the host PC 108 is installed is conference room 1, there are five wireless interfaces with IDs I/F-ID1 to I/F-ID5 in the conference room 1; on date and time α, eight persons from a participant α1 to a participant α8 are registered to participate in a conference called a conference name α, and participants are similarly registered for date and time β and date and time γ. The participant α1, for example, can be the employee A in FIG. 6. The wireless interfaces I/F-ID1 through I/F-ID5 are included in the wireless interface 106.

The conference participant information is information that designates participants in various conferences; the conference participant information is input through a keyboard (not shown) of the host PC 108, or via the network 107, into the memory 184 of the host PC 108. The employee information in FIG. 6 is similarly input into the memory 184.

Figure 8:
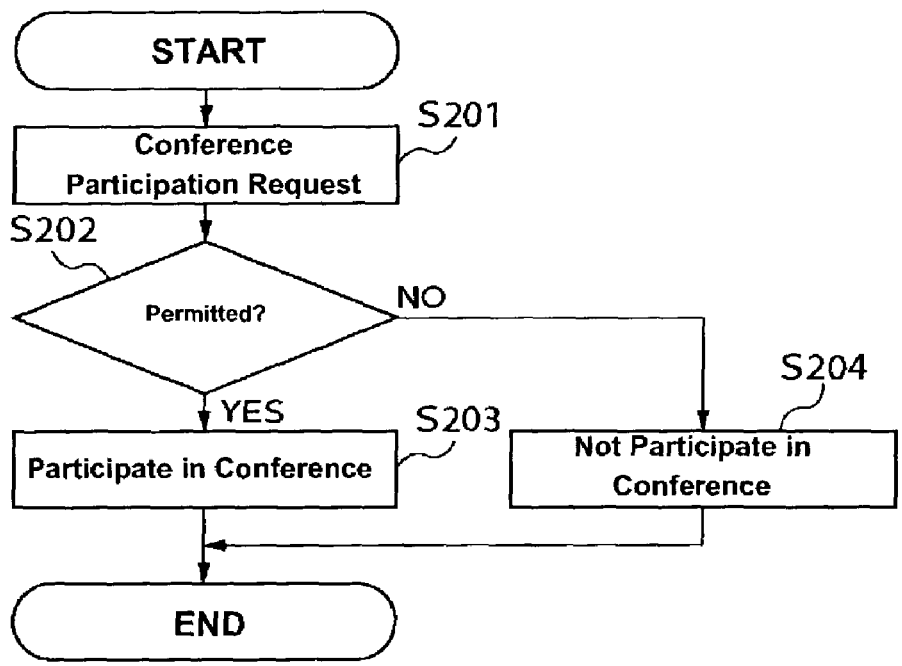
FIG. 8 shows a flowchart of a control procedure of terminals (notebook PCs 101, 102 and 105; a PDA 103; and a cellular phone 105) in FIG. 4.

Next, we will describe the control of a participant's terminal as we refer to FIG. 8. FIG. 8 is a flowchart indicating the control procedure of terminals other than shared terminals in the conference system in FIG. 4.

A personally registered participant (for example, the employee A) uses a terminal that he or she owns (in the example in FIG. 6, one of the three equipment with MAC addresses MAC-A1, MAC-A2 and MAC-A3, or one of two cellular phones with cellular IDs cellular ID-A1 and cellular ID-A2) to request a participation in a conference. Specifically, as shown in FIG. 8, in step S201 a conference participation request is made to the host PC 108 in the conference room. The conference participation request includes the ID (a MAC address or a cellular ID) of the terminal used.

Next, in step S202, a determination is made as to whether a conference participation permission has been received from the host PC 108 as a response to the conference participation request. If the conference participation permission has been received, the participant participates in the conference in step S203. If the conference participation request is not received in a predetermined amount of time, or if a conference participation refusal is received as a response, the participant in step S204 does not participate in the conference.

Figure 9:
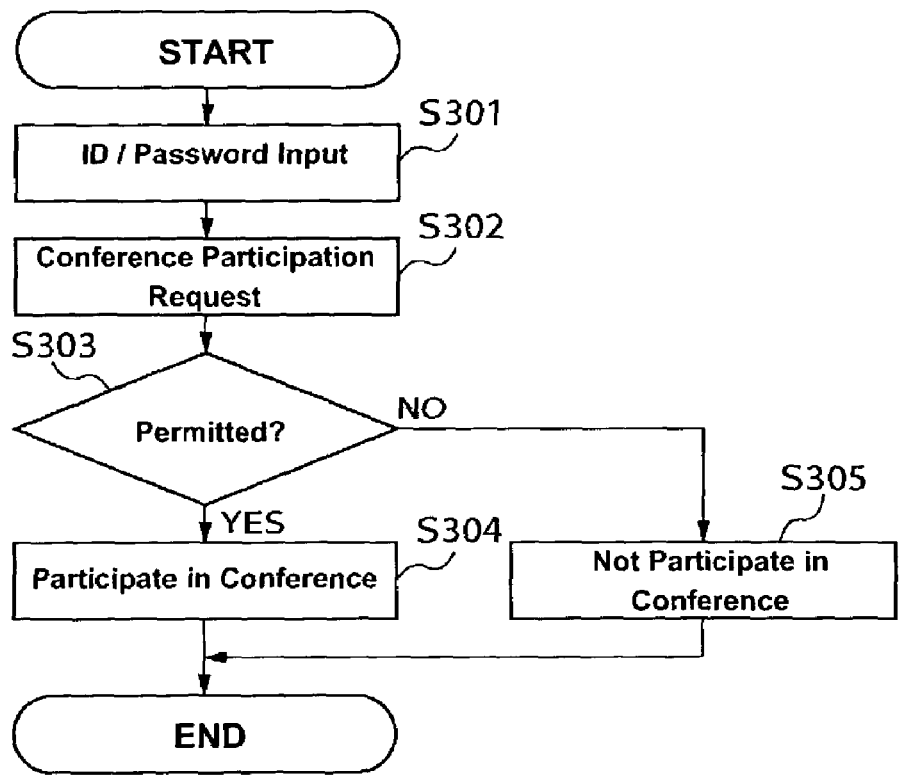
FIG. 9 shows a flowchart of a control procedure of a shared terminal in the conference system in FIG. 4.

Next, the control of a shared terminal in the conference system is described with reference to FIG. 9. FIG. 9 is a flowchart indicating the control procedure for controlling a shared terminal in the conference system in FIG. 4.

A participant who participates in a conference using a terminal that is shared (in the example in FIG. 6, one of three equipment with MAC addresses MAC-shared 1, MAC-shared 2 and MAC-shared 3, or of two cellular phones with cellular IDs cellular ID-shared 1 and cellular ID-shared 2) obtains a permission to participate in a conference using the shared terminal. More specifically, as shown in FIG. 9, in step S301 an ID and password are input; in step S302, a conference participation request is sent to the host PC 108. The conference participation request includes the ID (employee ID) and the password that were input in step S301, as well as equipment ID (a MAC address or a cellular ID).

In step S303, a determination is made as to whether a conference participation permission has been received from the host PC 108. If the conference participation permission has been received from the host PC 108, the participant participates in the conference in step S304. On the other hand, if the conference participation request is not received in a predetermined amount of time, or if a conference participation refusal is received from the host PC 108, the participant in step S305 does not participate in the conference.

Figure 10:
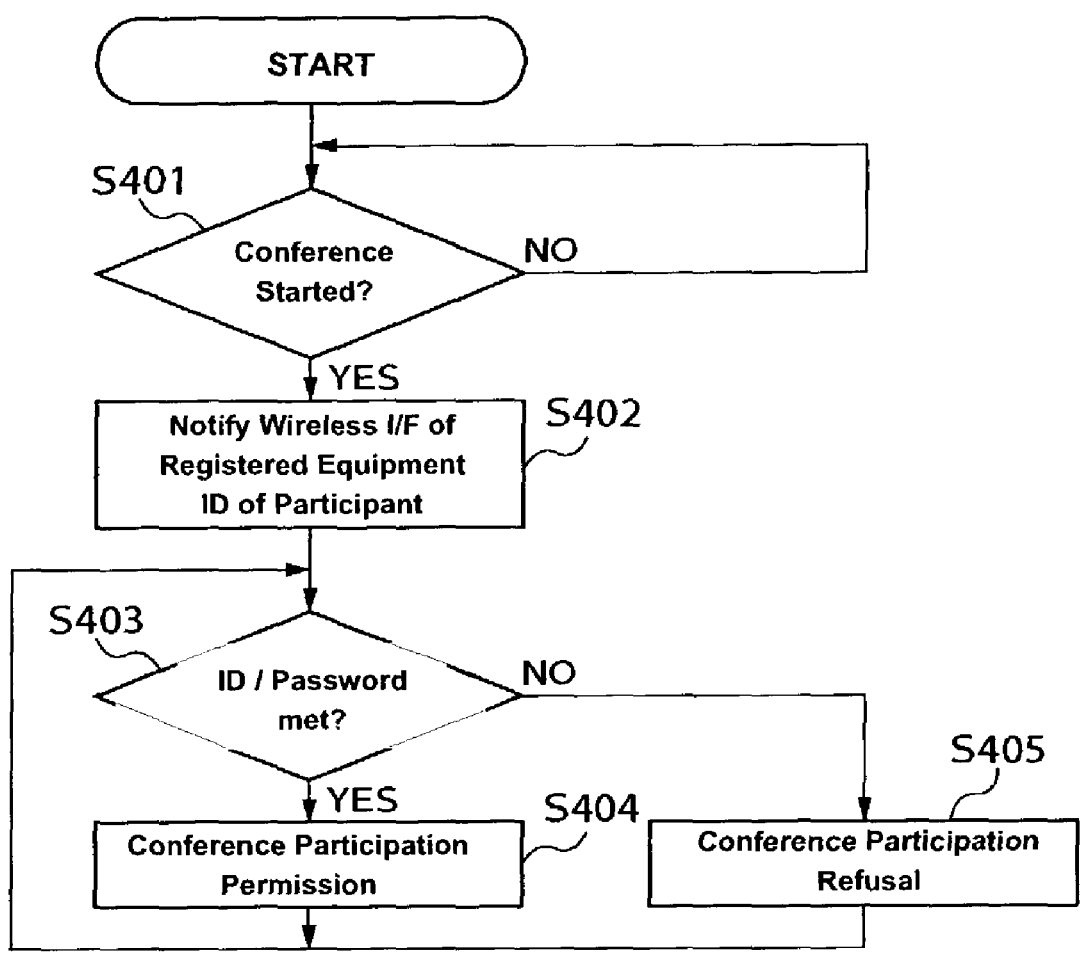
FIG. 10 shows a flowchart of a control procedure of the host PC in FIG. 4.

Next, the control of the host PC 108 is described with reference to FIG. 10. FIG. 10 is a flowchart indicating the control procedure of the host PC 108 in FIG. 4. FIG. 10 indicates a part of a program that the CPU 183 reads from the memory 184. The following is a description of an operation by the host PC 108 under the control of the CPU 183 that executes the program.

As shown in FIG. 10, the host PC 108 in step S401 waits for a user to perform an operation to begin a conference. Once the operation to begin a conference is performed, participants' registered equipment IDs are notified in step S402 to the wireless interface 106 based on the employee information in FIG. 6 and the conference participant information in FIG. 7. The operation to begin a conference that is performed in step S401 is input through an operating section (not shown) of the host PC 108. Based on the employee information in FIG. 6, the host PC 108 judges the employee IDs of participants and determines the devices owned by the participants designated in the participant information in FIG. 7. If a conference with the conference name a begins, IDs of equipment registered in the memory 184 corresponding to each of the participants α1 through α8 are notified to the wireless interface 106. For example, if the participant α1 is the employee A, the CPU 183 notifies MAC-A1, MAC-A2 and MAC-A3, as well as cellular ID-A1 and cellular ID-A2, as indicated in FIG. 6, to the wireless interface 106. The CPU 183 also notifies the shared equipment IDs to the wireless interface 106. In FIG. 6, IDs of shared equipment are MAC-shared 1, MAC-shared 2, MAC-shared 3, cellular ID-shared 1 and cellular ID-shared 2. IDs of the participants' equipment and IDs of shared equipment are stored in the memory 164 of the wireless interface 106.

As described later, the wireless interface 106 allows access only from registered wireless equipment. Consequently, participants with equipment registered as belonging to conference participants can participate in conferences without having their IDs or passwords checked. In other words, equipment owned by conference participants is equipment that allows the owner to participate in conferences without any ID or password checks.

On the other hand, if a conference participation request is received from a shared equipment via the wireless interface 106 and the network 107, the CPU 183 in step S403 checks the ID (an employee ID) and password included in the conference participation request; if the ID (an employee ID) and the password match the data in FIG. 6, the CPU 183 in step S404 sends a conference participation permission as a reply to the corresponding terminal via the wireless interface 106. The conference participation permission includes a terminal ID (a MAC address or a cellular ID) of the terminal that has been granted a permission to participate in the conference. For example, if the employee B requests a participation in a conference by inputting his employee ID and password in a shared equipment, the host PC 108 compares the employee ID and password included in the conference participation request against the data in FIG. 6 stored in the memory 184; if they match, the employee B is granted a permission to participate in the conference. The wireless interface 106 stores in the memory 164 the terminal IDs (MAC addresses or cellular IDs) of the terminals granted a permission to participate in the conference.

On the other hand, if the ID and password do not match the data in FIG. 6 when a conference participation request is received from a shared equipment, the host PC 108 in step S405 sends a conference participation refusal as a reply to the corresponding terminal via the network 107 and the wireless interface 106. The shared equipment is equipment that is granted a permission to participate in conferences upon checking the ID and password of the participant using the shared equipment.

Figure 11:
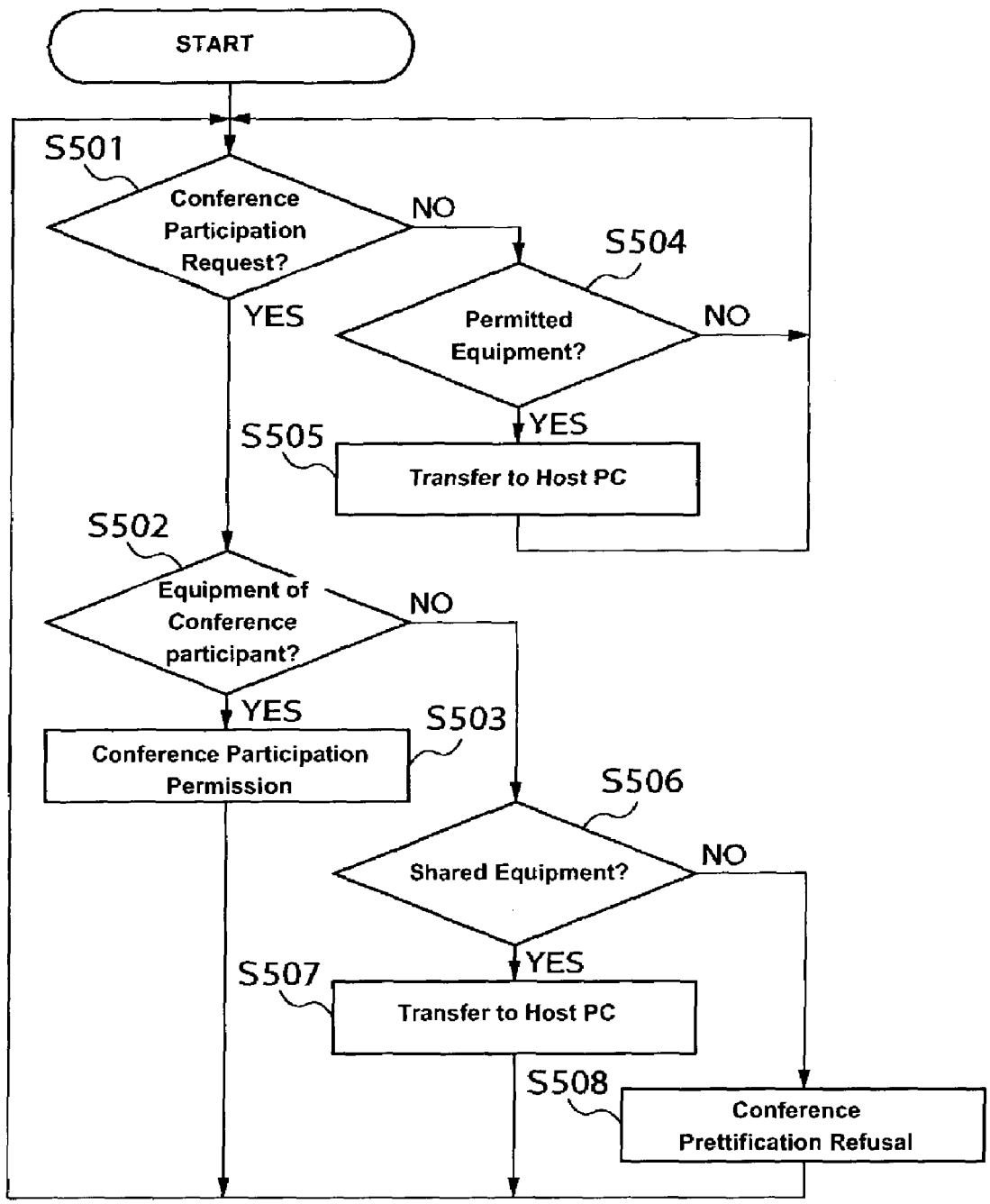
FIG. 11 shows a flowchart of a control procedure of the wireless interface in FIG. 4.

Next, the control of the wireless interface 106 is described with reference to FIG. 11. FIG. 11 is a flowchart indicating the control procedure of the wireless interface 106 in FIG. 4.

As indicated in FIG. 11, the wireless interface 106 in step S501 determines whether a message received from a terminal is a conference participation request. If the message received is a conference participation request, the wireless interface 106 in step S502 determines whether the terminal making the conference participation request is an equipment notified by the host PC 108 as belonging to a conference participant. The conference participation request includes the terminal ID of the terminal that sent the conference participation request. IDs of equipment owned by conference participants have been notified by the host PC 108 to the wireless interface 106 and stored in the memory 164. As a result, a conference participation request from an equipment registered as belonging to one of the participants (for example, if the employee A is a participant, MAC-A1, MAC-A2, MAC-A3, cellular ID-A1 and cellular ID-A2) allows the wireless interface 106 to determine that the equipment is a terminal that has been granted a permission to participate in the conference based on the equipment's ID (a MAC address or a cellular ID). If the terminal making the conference participation request is determined to be an equipment owned by a conference participant, a conference participation permission is sent as a reply in step S503.

If the terminal making the conference participation request is not an equipment owned by a conference participant, the wireless interface 106 in step S506 determines whether the terminal making the conference participation request is a shared equipment that has been notified in advance. IDs of shared equipment have been notified from the host PC 108 and stored in the memory 164. Whether the equipment is a shared equipment can be determined from the equipment ID (a MAC address or a cellular ID) included in the conference participation request. If the terminal making the conference participation request is determined to be a shared equipment that has been notified in advance, the wireless interface 106 in step S507 transfers the conference participation request from the terminal to the host PC 108; if the terminal making the conference participation request is not a shared equipment that has been notified in advance, the wireless interface 106 in step S508 sends a conference participation refusal as a reply to the terminal making the conference participation request.

If the message received from the terminal in step S501 is determined not to be a conference participation request, the wireless interface 106 in step S504 determines whether the terminal is an equipment that has been granted a permission to participate in the conference. The determination in step S504 is made based on a source equipment ID included in the message. IDs of equipment granted a permission to participate in the conference are IDs of equipment (not including shared equipment) that have been notified in step S402 of FIG. 10 as having a permission to participate in the conference, or IDs of shared equipment that have been notified in step S404 of FIG. 10 as having a permission to participate in the conference. If the terminal in question is an equipment that has been granted a permission to participate in the conference, the wireless interface 106 in step S505 transfers the message received from the terminal to the host PC 108 and returns to step S501. In response to this message, the host PC 108 revises the display content of the projector 109 and sends to the terminals participating in the conference the revised display content of the projector 109.

On the other hand, if the terminal is determined in step S504 not to be an equipment that has been granted a permission to participate in the conference, the wireless interface 106 does not execute any processing and returns to step S501.

In this way, whenever there is a conference participation request from a terminal, the wireless interface 106 refers to the information that correlates the terminal ID to the owner of the terminal (indicated in FIG. 6), and depending on whether the owner of the terminal making the conference participation request is registered in the conference participant information (indicated in FIG. 7), determines whether to grant or refuse a permission to participate in the conference; as a result, participants can participate in conferences through a simple procedure.

Although an operation to begin a conference is performed on the host PC 108 according to the present embodiment, the conference can be begun by using an application that begins the conference when the time to begin the conference arrives.

Furthermore, although the information in FIGS. 6 and 7 is stored in the host PC 108 according to the present embodiment, the present invention can also be realized by using a system that stores such information in a dedicated server.

In another embodiment, as shown in FIG. 12, files that were accessed during a conference are correlated to the conference and stored in a memory 184; if someone subsequently attempts to access those files, a host PC 108 grants or refuses a permission to access the files depending on whether the person was a participant in the conference. For example, equipment that will be granted a permission to access files correlated to a conference name α and stored in the memory 184 are equipment owned by participants α1 through α8 indicated in FIG. 7, which is stored in the memory 184. Granting or refusing a permission to access files also takes place under control of a CPU 183 that executes programs stored in the memory 184.

The present invention can be achieved by having a storage medium that stores program codes of software that realize the functions of the embodiments described above supplied to a system or an apparatus, and by having a computer (or a CPU or an MPU) of the system or the apparatus read and execute the program codes stored in the storage medium.

In this case, the program codes themselves that are read from the storage medium realize the new functions of the present invention, and the storage medium that stores the program codes constitute the present invention.

The storage medium on which to supply the program codes may be a Floppy Disk (a registered trademark), a hard disk, an optical disk, an optical magnetic disk, a CD-ROM, a CD-R, a CD-RW, a magnetic tape, a nonvolatile memory card or a ROM. Program codes may also be supplied from a server computer via a communication network.

Furthermore, the present invention is applicable not only when the program codes read by a computer are executed to realize the functions of the embodiments, but also when an operating system that operates on the computer performs a part or all of the actual processing based on the instructions contained in the program codes and thereby realizes the functions of the embodiments.

Moreover, the present invention is also applicable when the program codes that are read from the storage medium are written on a memory of an expansion board inserted into a computer or of an expansion unit connected to a computer, and a CPU provided on the expansion board or on the expansion unit performs a part or all of the actual processing based on the instructions contained in the program codes and thereby realizes the functions of the embodiments.

While the description above refers to particular embodiments of the present invention, it will be understood that many modifications may be made without departing from the spirit thereof. The accompanying claims are intended to cover such modifications as would fall within the true scope and spirit of the present invention.

The presently disclosed embodiments are therefore to be considered in all respects as illustrative and not restrictive, the scope of the invention being indicated by the appended claims, rather than the foregoing description, and all changes which come within the meaning and range of equivalency of the claims are therefore intended to be embraced therein.

What is claimed is:

1. A conference apparatus comprising:
    a memory unit that stores information relating to at least one device and an owner of the at least one device;
    a designating unit that designates at least one participant in a conference;
    a receiving unit that receives a participation request for participating in the conference from a requesting device;
    a judging unit that judges whether the requesting device is owned by the at least one participant designated by said designating unit based on the information stored in said memory unit; and
    wherein said memory unit further stores information relating to at least one device that is not correlated to an owner, and said judging unit determines whether or not the requesting device is the at least one device that is not correlated to the owner but permitted to participate in the conference.

2. A conference apparatus according to claim 1, wherein said memory unit further stores a file corresponding to the conference, and said judging unit allows access to the file when the requesting device is owned by the at least one participant in the conference.

3. A conference apparatus according to claim 1, wherein said memory unit and said judging unit are implemented in a host computer, and said designating unit is implemented in a communication device owned by the at least one participant, wherein the host computer and the communication device are connected via a communication network.

4. A method for participating in a conference via a communication network, the method comprising the steps of:
    storing information relating to at least one device and an owner of the at least one device in a memory unit;
    designating at least one participant in a conference;
    receiving a participation request for participating in the conference from a requesting device;
    judging whether the requesting device is owned by the at least one participant designated in said designating step based on the information stored in the said storing step; and
    storing information relating to at least one device that is not correlated to an owner, and determining whether or not the requesting device is the at least one device that is not correlated to the owner is but permitted to participate in the conference.

5. A method for participating in a conference via a communication network according to claim 4, further comprising the steps of storing a file corresponding to the conference, and permitting an access to the file when the requesting device is owned by the at least one participant in the conference.

* * * * *

UNITED STATES PATENT AND TRADEMARK OFFICE
CERTIFICATE OF CORRECTION

| | | |
|---|---|---|
| PATENT NO. | : 7,191,214 B2 | Page 1 of 1 |
| APPLICATION NO. | : 10/353269 | |
| DATED | : March 13, 2007 | |
| INVENTOR(S) | : Mitsuhiro Watanabe | |

It is certified that error appears in the above-identified patent and that said Letters Patent is hereby corrected as shown below:

COLUMN 3:

Line 6, "Par" should read --At least one par- --.

COLUMN 5:

Line 11, "a" should read --α--.

COLUMN 8:

Line 18, "device;" should read --device; and--;
Line 22, ";and" should read --,--; and
Line 55, "is but" should read --but is--.

Signed and Sealed this

First Day of July, 2008

JON W. DUDAS
*Director of the United States Patent and Trademark Office*